(No Model.)

F. L. ARLINGTON.
PERMUTATION PADLOCK.

No. 586,943.            Patented July 20, 1897.

WITNESSES
W. A. Schoenborn
C. M. Mason

INVENTOR.
Frank L. Arlington
by John Wedderburn
Attorney

UNITED STATES PATENT OFFICE.

FRANK LEONARD ARLINGTON, OF CLAREMORE, ARKANSAS, ASSIGNOR OF ONE-THIRD TO HENRY MILLER AND GEORGE MILLER, OF LITTLE ROCK, ARKANSAS.

PERMUTATION-PADLOCK.

SPECIFICATION forming part of Letters Patent No. 586,943, dated July 20, 1897.

Application filed August 3, 1896. Serial No. 601,529. (No model.)

*To all whom it may concern:*

Be it known that I, FRANK LEONARD ARLINGTON, a citizen of the United States, residing at Claremore, in the county of Pulaski and State of Arkansas, have invented certain new and useful Improvements in Padlocks; and I do hereby declare the following to be a full, clear, and exact description of the invention, such as will enable others skilled in the art to which it appertains to make and use the same.

My invention relates to certain new and useful improvements in padlocks, the object of the same being to provide a keyless combination-lock especially adapted for use upon bicycles.

The invention consists in the construction, combination, and arrangements of parts which will be hereinafter more fully described and claimed.

Figure 1:
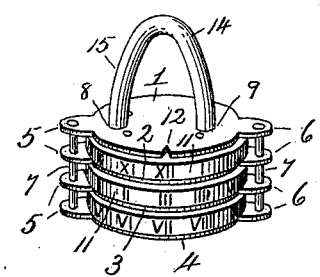
Figure 2:
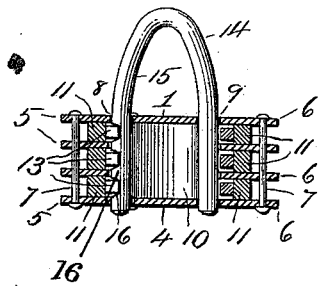
Figure 3:
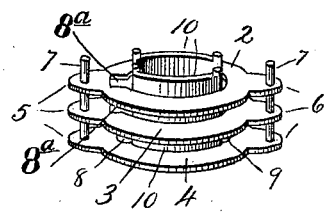
Figure 4:

In the drawings forming a part of this specification, Figure 1 represents a perspective view of my improved padlock. Fig. 2 is a vertical longitudinal section through the same. Fig. 3 is a perspective view of the lock-casing with the tumbler-rings removed. Fig. 4 is a detail perspective view of one of said tumbler-rings.

Like reference-numerals indicate like parts in the different views.

The casing of my padlock is made up of a series of disks 1 2 3 4, having ears 5 6 upon opposite sides thereof, the said disks being connected together at a suitable distance apart by means of bolts or securing-pins 7 7, passing through the ears 5 and 6 of each of said disks. The disks 1 and 4 are provided with alined openings 8 and 9, respectively, the openings 9 being slightly nearer the center of the disk than the openings 8, and the disks 2 and 3 are provided with cut-away portions 8ª in line with the openings 8. The said series of disks are further connected by guide-plates 10 10, arranged in pairs on opposite sides of openings 8 and 9. Fitting between the disks 1, 2, 3, and 4, of which the lock-casing is made up, are tumbler-rings 11 11, each having numbers arranged at regular intervals upon its outer edge and adapted to be brought in line with a notch 12 upon the upper disk 1. The said rings 11 are mounted to rotate between the disks of the casing and are held in place therein by means of the guide-plates 10 10, the said plates engaging the inner edges of said rings. Each of the tumbler-rings 11 11 has a notch or cut-away portion 13 upon its inner edge, which is adapted to be thrown into line with the openings 8 in the disks 1 2 3 4, for a purpose which will hereinafter appear. Adapted to fit within the openings 8 and 9 in the casing is a staple 14, one of whose arms 15 is provided with a series of teeth 16 16 thereon.

If it be desired to lock the staple 14 to the main part of the lock, the tumbler-rings are rotated so that the notches 13 therein are in line with the openings 8 in the casing. This can be determined when the combination to which the lock is set is known by turning the tumbler-rings 10 so that the proper series of numbers will lie opposite the notch 12 on the disk 1. After the staple has been inserted in its place and one or more of the tumbler-rings 10 is rotated the notches 13 are thrown out of alinement with the openings 8 and the main body portion of said rings passes between the teeth 16 on the arm 15 of the staple and said staple is held securely in place. In order to remove the same, it is necessary to return the tumbler-rings to their original position with the notches 13 therein lying in line with the openings 8. The said staple is then free to be removed.

From the foregoing description it will be seen that I have devised an extremely simple padlock in which no key is required to lock or unlock the same and which cannot be locked or unlocked unless the combination to which it is set be known.

Having now described my invention, what I claim as new, and desire to secure by Letters Patent, is—

The herein-described keyless combination-padlock consisting of a casing made up of a series of disks having ears upon opposite sides thereof, pins extending through said ears for securing said disks permanently and rigidly together, the said disks being slightly separated one from the other at all points and provided with alined openings therein, guide-plates connecting said disks at points adjacent to said openings, a series of tumbler-rings having numbers printed or impressed upon their outer edges, mounted to rotate between the pairs of said disks, held in place therein by means of said guide-plates and provided with notches along their inner edges which are adapted to be thrown into line with openings in said disks, and a staple adapted to fit within the openings in said disks, one arm of which is provided with a series of notches or teeth with which said tumbler-rings are adapted to engage, substantially as and for the purpose described.

In testimony whereof I have signed this specification in the presence of two subscribing witnesses.

FRANK LEONARD ARLINGTON.

Witnesses:
R. L. BETTIS,
C. C. WALKER.